(12) United States Patent
Oudenhoven et al.

(10) Patent No.: US 12,345,882 B2
(45) Date of Patent: Jul. 1, 2025

(54) ELECTRONIC DEVICES WITH REARWARD-FACING SENSORS

(71) Applicant: Apple Inc., Cupertino, CA (US)

(72) Inventors: Michael J. Oudenhoven, San Francisco, CA (US); Brian S Lau, Sacramento, CA (US); Cameron A Harder, San Francisco, CA (US); Depeng Wang, San Jose, CA (US); Vikrant Bhakta, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/335,671

(22) Filed: Jun. 15, 2023

(65) Prior Publication Data

US 2024/0027753 A1      Jan. 25, 2024

Related U.S. Application Data

(60) Provisional application No. 63/391,544, filed on Jul. 22, 2022.

(51) Int. Cl.
*G02B 27/00* (2006.01)
*G02B 17/08* (2006.01)
*G06F 1/16* (2006.01)
*G06F 3/01* (2006.01)

(52) U.S. Cl.
CPC ....... *G02B 27/0093* (2013.01); *G02B 17/086* (2013.01); *G06F 1/163* (2013.01); *G06F 3/013* (2013.01)

(58) Field of Classification Search
CPC .............. G02B 27/0093; G02B 17/086; G02B 27/0172; G06F 1/163; G06F 3/013
See application file for complete search history.

(56) References Cited

U.S. PATENT DOCUMENTS

| | | | |
|---|---|---|---|
| 8,537,075 B2 * | 9/2013 | Crocco | G02B 27/0172 349/11 |
| 8,705,177 B1 | 4/2014 | Miao | |
| 9,720,228 B2 | 8/2017 | Harrison et al. | |
| 9,880,441 B1 * | 1/2018 | Osterhout | G02B 27/0172 |
| 10,877,556 B2 | 12/2020 | Berkner-Cieslicki et al. | |
| 11,016,302 B2 | 5/2021 | Freeman et al. | |

(Continued)

FOREIGN PATENT DOCUMENTS

WO    WO-2023246812 A1 * 12/2023

*Primary Examiner* — Temesghen Ghebretinsae
*Assistant Examiner* — K. Kiyabu
(74) *Attorney, Agent, or Firm* — Treyz Law Group, P.C.; Tianyi He

(57) ABSTRACT

A head-mounted device may have a housing with a frame that supports lenses. Each lens may have a positive bias lens element and a negative bias lens element. A waveguide may overlap the lens. During operation, images from the waveguide may be provided to an eye box through the negative bias lens element. An eye sensor such as a gaze tracking camera may operate through the negative bias lens element. The negative bias lens element may have a protruding portion through which the sensor operates, may have a surface facing the sensor that has a curved surface to provide a desired lens characteristic, may have a prism for helping to couple light from the eye box to the eye sensor, and/or may have other features to facilitate use of the eye sensor to monitor the eye of a user in the eye box.

19 Claims, 4 Drawing Sheets

(56) References Cited

U.S. PATENT DOCUMENTS

| | | |
|---|---|---|
| 11,073,695 B2 | 7/2021 | Gao et al. |
| 11,762,222 B2* | 9/2023 | Dominguez ............. G02C 9/00 351/158 |
| 2006/0007367 A1* | 1/2006 | Cho .................. G02F 1/133308 349/58 |
| 2011/0249230 A1* | 10/2011 | Blum ..................... G02C 11/10 351/57 |
| 2016/0187654 A1* | 6/2016 | Border ............... G02B 27/0172 359/630 |
| 2018/0032812 A1* | 2/2018 | Sengelaub ............. G06T 7/248 |
| 2018/0275409 A1* | 9/2018 | Gao .................. G02B 27/0093 |
| 2019/0129178 A1* | 5/2019 | Patterson ........... G02B 27/0172 |
| 2019/0212489 A1* | 7/2019 | Xu ........................ G02F 1/1335 |
| 2019/0259213 A1 | 8/2019 | Yuan et al. |
| 2020/0051320 A1 | 2/2020 | Laffont et al. |
| 2020/0081253 A1* | 3/2020 | Montevirgen ..... G02B 27/0172 |
| 2021/0364802 A1* | 11/2021 | Uchiyama ................ G02C 9/04 |
| 2023/0061866 A1* | 3/2023 | Ouderkirk .......... G02B 27/0172 |
| 2023/0119935 A1* | 4/2023 | Sztuk ................ G02B 27/0172 345/8 |
| 2024/0272439 A1* | 8/2024 | Jiang ..................... G02B 7/026 |

\* cited by examiner

ELECTRONIC DEVICES WITH REARWARD-FACING SENSORS

This application claims the benefit of provisional patent application No. 63/391,544, filed Jul. 22, 2022, which is hereby incorporated by reference herein in its entirety.

FIELD

This relates generally to electronic devices, and, more particularly, to wearable electronic devices such as head-mounted devices.

BACKGROUND

Electronic devices such as head-mounted devices are configured to be worn on the heads of users. A head-mounted device may have lenses through which a user may view real-world objects while the device is being worn. Displays may be used to present images to the user that overlap the real-world objects.

SUMMARY

Electronic devices such as head-mounted electronic devices may include displays that generate display images. Waveguides may be used to present the display images to eye boxes for viewing by a user.

A head-mounted device may have a housing with a frame that houses left and right lenses (sometimes referred to as head-mounted device lenses or eyeglass lenses). Each eyeglass lens may have a positive bias lens (positive bias lens element) and a negative bias lens (negative bias lens element). A waveguide may overlap each eyeglass lens and may be located between the positive bias lens and negative bias lens of that eyeglass lens.

During operation, display images from a waveguide may be provided to an eye box through the negative bias lens element of the eyeglass lens that is overlapped by the waveguide. An eye sensor such as a gaze tracking camera may operate through the negative bias lens element. The negative bias lens element may have a protruding portion through which the sensor operates, may have a surface facing the sensor that has a curved surface shape to provide a lens characteristic, may have a prism for helping to couple light from the eye box to the eye sensor, and/or may have other features to facilitate use of the eye sensor to monitor the eye of a user in the eye box without creating an overly bulky eye sensor configuration for the head-mounted device.

DETAILED DESCRIPTION

An electronic device such as a head-mounted device may have a housing configured to be worn on a head of a user. The device may have left and right lenses mounted in front of left and right eye boxes, respectively. Left and right displays may provide respective left and right images to the eye boxes using waveguides in the left and right lenses. When the user's eyes are located in the left and right eye boxes, the user may view images from the displays that are superimposed on real-world objects being viewed through the lenses.

Input-output devices such as buttons and other devices may be used to gather user input for controlling the head-mounted device. In an illustrative configuration, eye sensors may be used to monitor the eyes of the user in the left and right eye boxes. The eye sensors may include, for example, gaze tracking sensors. The gaze tracking sensors may have optional light-emitting diodes or other light sources that illuminate the user's eyes (e.g., to create eye-tracking glints on the eyes) and may have image sensors (sometimes referred to as gaze tracking cameras) facing the user's eyes. Captured image data from the image sensors may be used to measure the user's point-of-gaze (sometimes referred to as the user's direction of view). The point-of-gaze information from the sensors may then be used as input to control the presentation of content with the displays and/or to otherwise serve as input for the head-mounted device.

Figure 1:
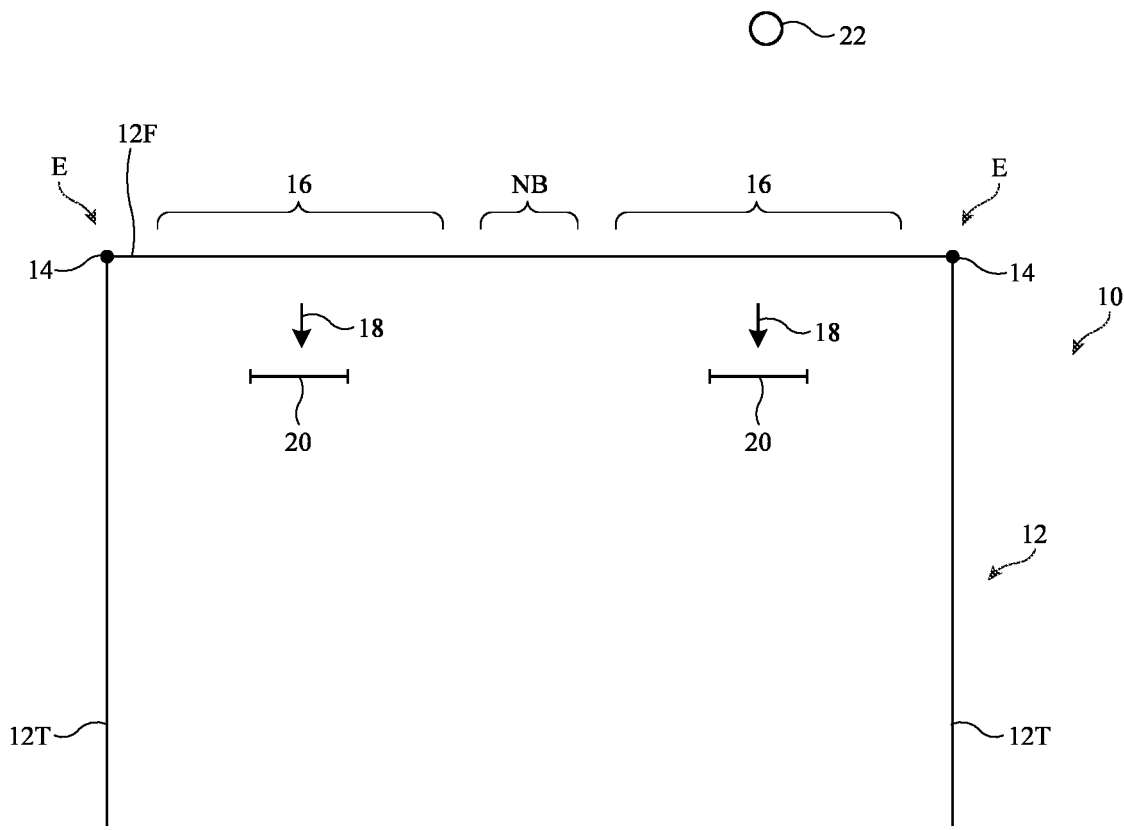
FIG. 1 is a top view of an illustrative head-mounted device in accordance with an embodiment.

FIG. 1 is a top view of an illustrative head-mounted device. As shown in FIG. 1, head-mounted device 10 may have a housing such as housing 12. Housing 12 may be configured to be worn on the head of user and may sometimes be referred to as a head-mounted support structure or head-mounted support. Housing 12 may include elongated side supports (sometimes referred to as side support members, side support structures, or temples) that are configured to run along the left and right sides of a user's head (e.g., over the ears) such as housing members 12T and may have a front frame (lens frame) such as frame 12F in which lenses 16 are mounted. Hinges 14 and/or other coupling structures may be used to attach frame 12F to elongated side members 12T. Frame 12F may have a nose bridge portion such as nose bridge portion NB that is configured to rest on a user's nose.

During operation, displays such as display projectors may provide images to waveguides. The display projectors may be located in nose bridge portion NB or at left and right edges E of frame 12F. The waveguides may have output couplers (e.g., holographic output couplers) overlapping lenses 16. Images from the displays may be conveyed through the waveguides to the output couplers and may then be coupled out of the waveguides in directions 18 towards eye boxes 20 for viewing by the user. The user may view real-world objects such as object 22 through lenses 16 while viewing superimposed images from the displays.

Figure 2:
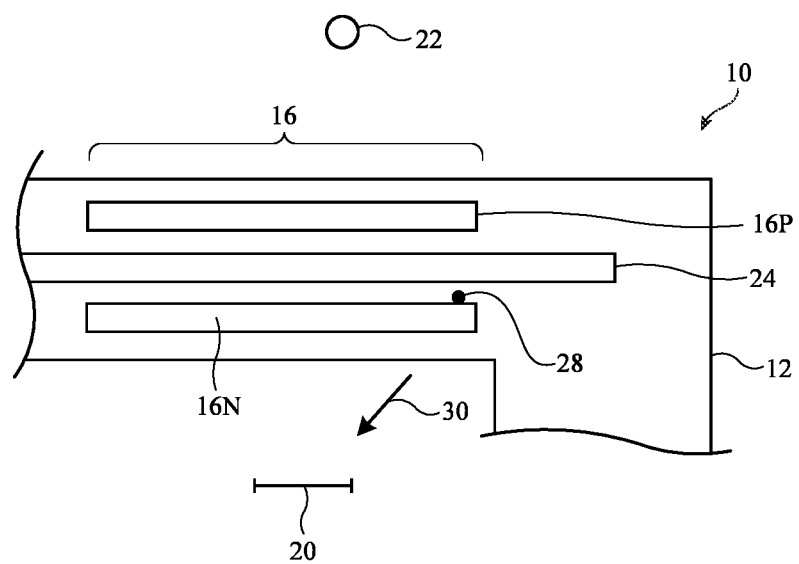
FIG. 2 is a cross-sectional top view of an edge portion of an illustrative head-mounted device in accordance with an embodiment.

FIG. 2 is a cross-sectional top view of an edge portion of device 10 in the vicinity of one of lenses 16. As shown in FIG. 2, lens 16 may include an outwardly facing outer lens element 16P and an inwardly facing inner lens element 16N. Waveguide 24 may be interposed between lens element 16P and lens element 16N. The output coupler of waveguide 24 overlaps lens 16 and may or may not have an associated non-zero lens power. In an illustrative configuration, the output coupler of waveguide 24 has a zero lens power and therefore supplies images that are located at a virtual image distance of infinity. To enhance viewer comfort, inner lens 16N may be provided with a biasing lens power that adjusts the virtual image distance of the displayed images. For example, lens 16N may be provided with a negative lens power such as a −0.5 diopter lens power to place images from the display at a virtual image distance of 2 meters. Due to the negative biasing lens power that may be used with lens element 16N, lens element 16N may sometimes referred to as a negative bias lens element or a negative bias lens. To counteract the negative bias of element 16N and thereby ensure that external object 22 is in focus, lens 16 may include a compensating positive bias lens element (e.g., a lens with equal and opposite lens power to that of element 16N). In the example of FIG. 2, negative bias lens 16N has a lens power of −0.5 diopter, so lens element 16P may have a corresponding +0.5 diopter lens power. In the event that a user has a vision defect (e.g., a refractive error such as nearsightedness, farsightedness, astigmatism, etc.), the user's personal prescription can be incorporated into lens 16N (as an example). For example, if the user wears a +1 diopter prescription, negative bias lens 16N may be configured to exhibit a +0.5 diopter lens power (+1 diopter+−0.5 diopter) rather than a −0.5 diopter, while positive bias lens 16P still has a +0.5 diopter power to compensate for the non-prescription portion of the negative bias lens (−0.5 diopter in this example).

To minimize the bulk of device 10 and to avoid situations where the gaze tracking cameras or other eye sensors in device 10 intrude excessively into the viewing area of lenses 16, gaze tracking cameras (or other eye sensors) may be mounted so that they are located on the outwardly facing surface of lens element 16N (e.g., at a location such as location 28 of FIG. 2) and operate through lens element 16N (e.g., by being oriented so that they operate in inward direction 30). With this type of arrangement, the gaze tracking camera or other eye sensor may capture images of the user's eye in eye box 20 to monitor the user's eye (e.g., to monitor the point-of-gaze of the user).

Figure 3:
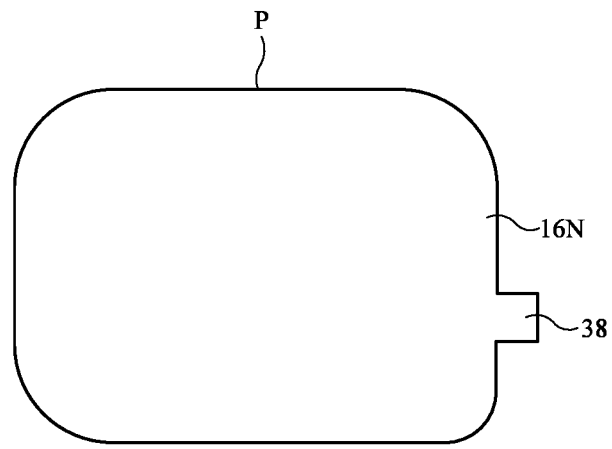
FIG. 3 is a front view of an illustrative negative bias lens element with a protrusion in accordance with an embodiment.

FIG. 3 is a front view of an illustrative negative bias lens (sometimes referred to as a lens element, inner lens, or rear lens). As shown in FIG. 3, lens element 16N may have a peripheral edge P. The outline of lens element 16N (e.g., the shape of edge P) may be circular, rectangular, may have a teardrop shape, may be oval, may have straight and/or curved edges, and/or may have any other suitable eyeglass lens shape. One or more gaze tracking camera mounting protrusions such as protrusion 38 may protrude laterally outward from edge P of lens 16N, as shown in FIG. 3. In an illustrative configuration, lens 16N has lateral dimensions on the order of 1-5 cm and protrusion 38 has lateral dimensions on the order of 1-15% of the lateral dimensions of lens 16N (e.g., 0.1-7.5 mm).

Figure 4:
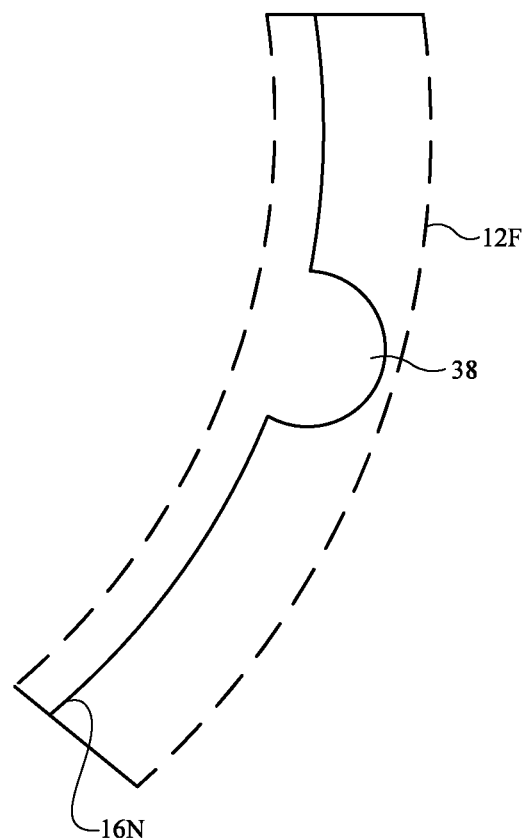
FIG. 4 is a front view of an illustrative negative bias lens element with a protrusion mounted in a housing in accordance with an embodiment.

FIG. 4 shows how the use of a localized protruding portion such as lens protrusion 38 of lens 16N rather than an overall enlargement of the lateral size of lens 14 may help maintain a compact overall size for housing 12 and device 10 without compromising the integrity of housing 12. Only a relatively small portion of frame 12F (which may have a ring shape in the portion surrounding lens 16) need be affected by the presence of protrusion 38, so the strength of frame 12F may be maintained while accommodating protrusion 38.

Figure 5:
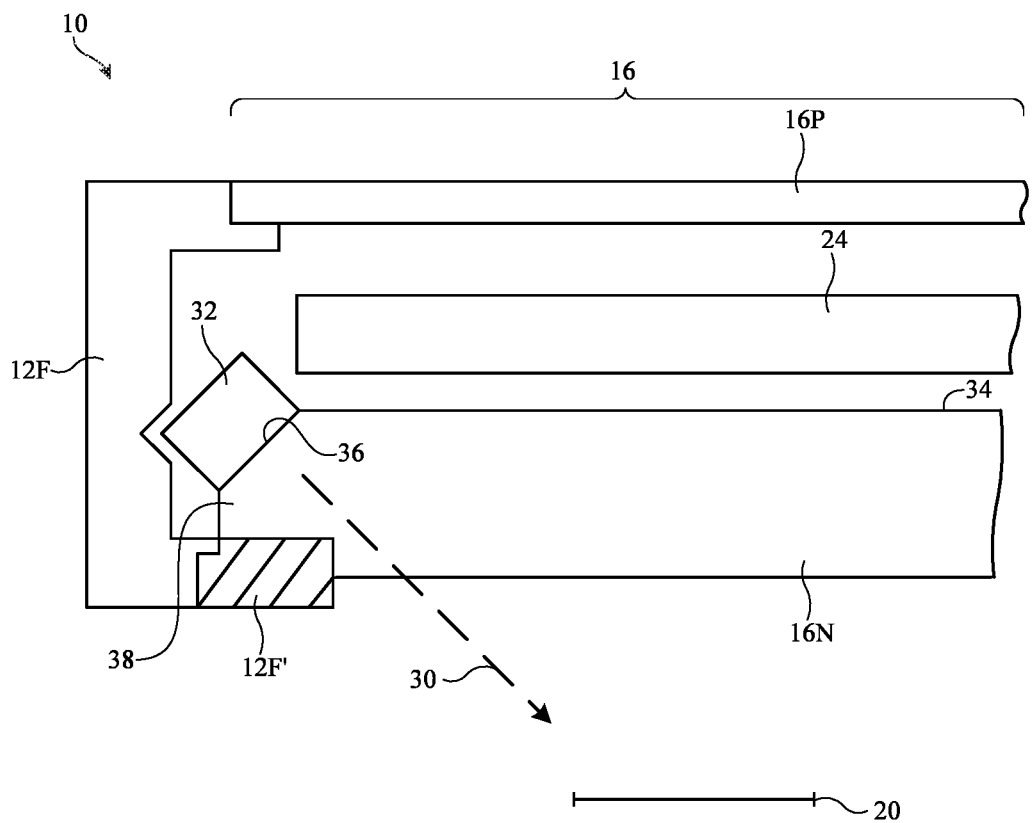
FIG. 5 is a cross-sectional top view of an edge portion of an illustrative head-mounted device in accordance with an embodiment.

FIG. 5 is a cross-sectional top view of a portion of device 10 showing how gaze tracking camera 32 may face inwardly towards eye box 20 in direction 30 and may operate through a peripheral edge portion of negative bias lens element 16N (e.g., protrusion 38 or a non-protruding portion of element 16N). Lens element 16N may have a gaze tracking camera surface such as surface 36 that is planar or that has another cross-sectional profile. As shown in FIG. 5, surface 36 may be formed from part of the outwardly facing surface of lens element 16N and may serve as a mounting surface for gaze tracking camera 32. Surface 36 may be tilted so that gaze tracking camera 32 can capture images of the user's eye in eye box 20. Frame 12F may have a detachable trim portion such as trim member 12F' (e.g., a ring-shaped trim member) that may be inserted into frame 12F to serve as a retention feature for lens element 16N (which may be installed in frame 12F from the rear). In some configurations, outer (front) lens element 16P may be installed in frame 12F from the front. Other arrangements for housing 12 may be used, if desired. The configuration of FIG. 5 in which frame 12F has a removable portion such as trim 12F' is illustrative.

Any suitable technique may be used for forming lens element 16N. For example, lens element 16N may be formed from glass or polymer, may be formed using glass molding and/or polymer molding in an injection molding tool or other molding tool, may be shaped using three-dimensional printing, may be shaped using machining (e.g., using a computer-controlled machining tool), and/or may otherwise be formed by molding, cutting, grinding, polishing, etc. As described in connection with FIG. 2, a user's eyeglass prescription may be incorporated into lens element 16N. With an illustrative configuration, molding may be used to form a polymer lens element blank that includes a camera-mounting protrusion while machining operations (edge trimming, grinding, and polishing) may be performed on lens element 16N to incorporate a user's prescription into element 16N, to optionally form camera-facing surfaces such as surface 36, to refine the shape of protrusion 38, to trim the peripheral edge of lens element 16N and/or to otherwise form a final desired shape for lens element 16N.

Figure 6:
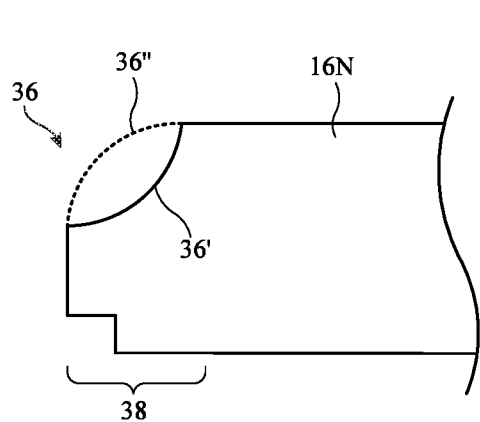
FIGS. 6, 7, and 8 are cross-sectional top views of portions of illustrative negative bias lens elements showing mounting locations for eye sensors in accordance with embodiments.

When gaze tracking camera 32 operates through lens element 16N, the user's prescription and the negative lens bias may affect the capturing of eye images by camera 32. To counteract the lensing effects of lens element 16N and/or to otherwise help focus eye images for camera 32, the portion of lens element 16N that is facing camera 32 may be provided with a non-planar optical surface that serves as a lens element (e.g., surface 36 may be shaped to provide surface 36 with a desired lens characteristic such as a desired lens power). As shown in FIG. 6, for example, surface 36 may have a curved cross-sectional profile and may be shaped to have a concave shape (see, e.g., concave surface 36') or a convex shape (see, e.g., convex shape 36"). In general, any suitable lens shape may be formed in the portion of the outer surface of lens element 16N that is facing camera 32 to provide this surface of lens element 16N with a desired lens characteristic. If desired, the lens formed by this portion of lens element 16N may be aspheric.

Figure 7:
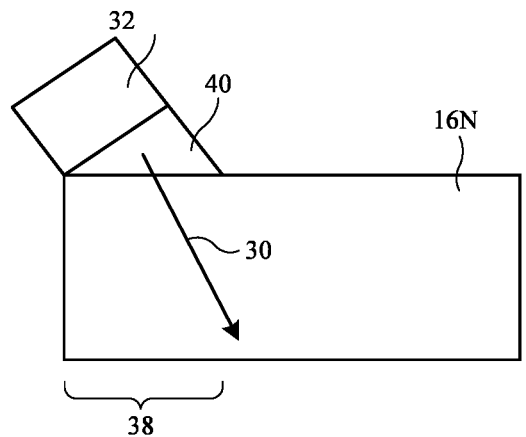

As shown in FIG. 7, camera 32 may be coupled to lens element 16N so that camera 32 can operate in direction 30 through lens element 16N using an optical coupler such as prism 40. Prism 40 may be a discrete optical element that is separate from lens element 16N or some or all of prism 40 may be formed as an integral portion of lens element 16N. If desired, prism 40 may be omitted so that a triangular air gap is present between camera 32 of FIG. 7 and the outer (forward-facing) surface of lens element 16N.

Figure 8:
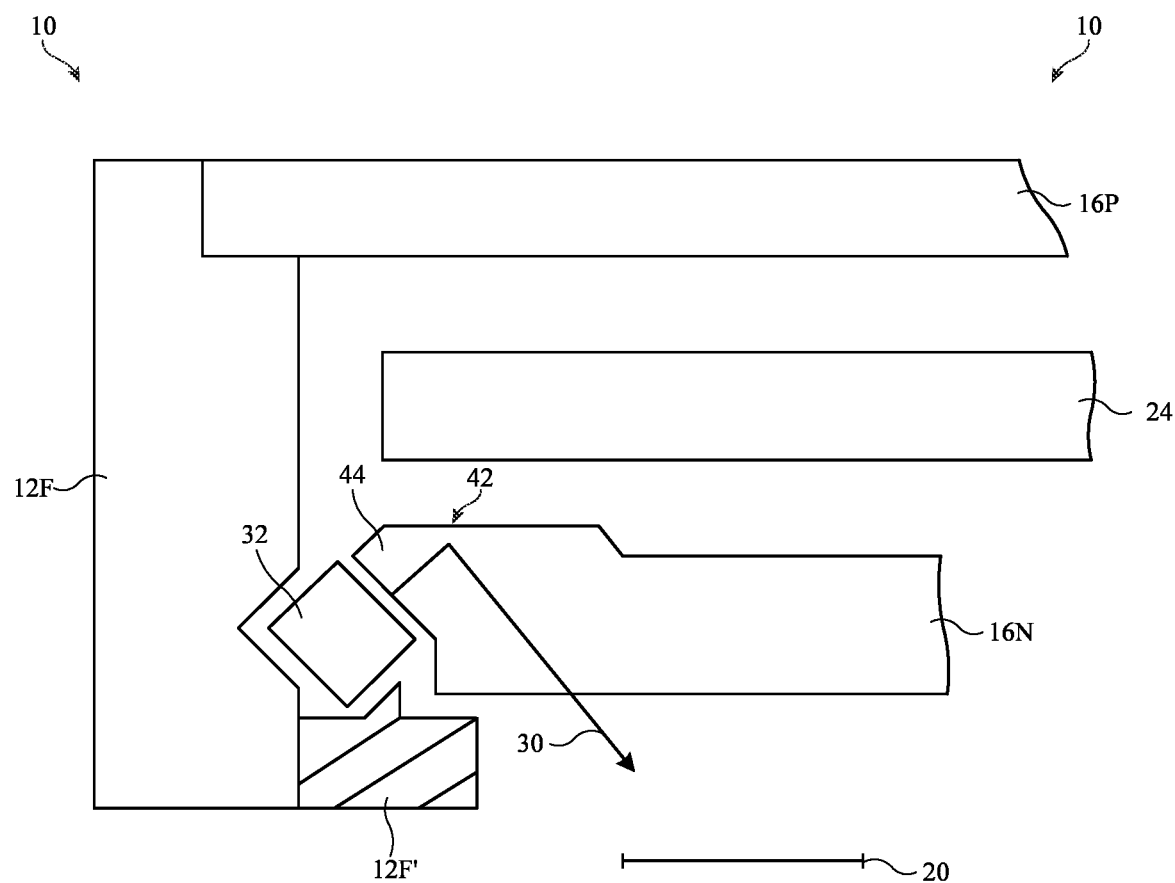

The example of FIG. 8 shows how lens element 16N may have an integral prism 44 that allows light associated with the operation of gaze tracking camera 32 to reflect internally within lens element 16N. Incoming light from eye box 20 may, for example, reflect internally from surface area 42 of lens element 16N towards camera 32. Prism 44 may, if desired, be formed from a protruding portion of lens element 16N (e.g., protrusion 38) that protrudes laterally outward from the center of lens element 16N.

The reverse eye sensor mounting arrangement of FIG. 8 allows camera 32 to face outwardly (away from eye box 20) while operating towards eye box 20 in direction 30 (e.g., to track the point-of-gaze of the user's eye located in eye box 20) and therefore provides additional freedom when packaging gaze tracking camera in frame 12F compactly.

In some embodiments, sensors may gather personal user information. To ensure that the privacy of users is preserved, all applicable privacy regulations should be met or exceeded and best practices for handling of personal user information should be followed. Users may be permitted to control the use of their personal information in accordance with their preferences.

The foregoing is merely illustrative and various modifications can be made to the described embodiments. The foregoing embodiments may be implemented individually or in any combination.

What is claimed is:

1. A head-mounted device, comprising:
   a head-mounted housing having a housing frame with a front and a rear;
   a positive bias lens mounted to the front of the housing frame and a negative bias lens mounted to the rear of the housing frame;
   a waveguide between the positive bias lens and the negative bias lens; and
   an eye sensor configured to monitor an eye box through the negative bias lens, wherein the negative bias lens has a portion with an outwardly-facing surface facing away from the eye box and an inwardly-facing surface facing the eye box, wherein the eye sensor is mounted to the portion of the negative bias lens at the outwardly-facing surface, wherein the portion of the negative bias lens is attached to the rear of the housing frame at the inwardly-facing surface, and wherein the portion protrudes from an edge of the negative bias lens and into the housing frame.

2. The head-mounted device defined in claim 1 wherein the eye sensor comprises a gaze tracking camera.

3. The head-mounted device defined in claim 2 wherein the negative bias lens has a surface area that faces the gaze tracking camera through which the gaze tracking camera operates.

4. The head-mounted device defined in claim 3 wherein the surface area of the negative bias lens that faces the gaze tracking camera is planar.

5. The head-mounted device defined in claim 3 wherein the surface area of the negative bias lens that faces the gaze tracking camera has a curved cross-sectional profile that provides the surface area with a lens characteristic.

6. The head-mounted device defined in claim 1 wherein the eye sensor is configured to monitor the eye box through the portion of the negative bias lens.

7. The head-mounted device defined in claim 1 wherein the negative bias lens has an integral prism through which the eye sensor operates.

8. The head-mounted device defined in claim 7 wherein the integral prism has a surface that reflects light for the eye sensor internally within the negative bias lens.

9. The head-mounted device defined in claim 1 further comprising a prism between the eye sensor and the negative bias lens.

10. A head-mounted device, comprising:
    a head-mounted support having a housing frame and having a ring-shaped trim member inserted into the housing frame;
    a lens mounted to the ring-shaped trim member and through which external objects are viewable from an eye box, wherein the lens has a protrusion that protrudes laterally from a peripheral edge of the lens; and
    a gaze tracking camera, wherein the protrusion has a surface facing the gaze tracking camera, wherein the surface is concave or convex, wherein the gaze tracking camera is configured to monitor the eye box through the surface of the protrusion of the lens, and wherein the surface of the protrusion overlaps the ring-shaped trim member.

11. The head-mounted device defined in claim 10 wherein the surface is an outwardly facing surface facing away from the eye box.

12. The head-mounted device defined in claim 10 wherein the surface is a mounting surface for the gaze tracking camera.

13. The head-mounted device defined in claim 10 wherein the surface forms an aspheric lens.

14. The head-mounted device defined in claim 10 further comprising a waveguide that is configured to provide an image to the eye box through the lens.

15. The head-mounted device defined in claim 10 further comprising a prism between the gaze tracking camera and the lens.

16. Glasses, comprising:
    elongated side supports;
    a lens frame coupled to the elongated side supports, wherein the lens frame comprises a ring-shaped portion;
    a lens in the lens frame through which a real-world object is viewable from an eye box, wherein the lens has a first lens with a positive lens power and has a second lens that is mounted in the ring-shaped portion of the lens frame;
    a waveguide that is configured to provide a display image to the eye box that is superimposed on the real-world object; and
    a sensor facing the second lens, disposed between the first lens and the second lens, and configured to monitor the eye box through a portion of the second lens, wherein the sensor is mounted to a surface of the portion of the second lens and wherein the portion of the second lens protrudes from an edge of the second lens into the ring-shaped portion of the lens frame.

17. The glasses defined in claim 16 wherein the waveguide is between the first lens and the second lens and wherein the sensor comprises a gaze tracking sensor configured to operate through the portion of the second lens.

18. The glasses defined in claim 16 wherein the sensor receives light that passes through the second lens but not the first lens.

19. The glasses defined in claim 16 wherein the second lens has an outwardly facing surface facing the first lens and wherein the sensor faces the outwardly facing surface and operates in an inward direction.

* * * * *